(12) United States Patent
Hohmann et al.

(10) Patent No.: US 7,661,336 B2
(45) Date of Patent: Feb. 16, 2010

(54) HYDRAULIC SCREW TIGHTENING OR TENSIONING DEVICE

(76) Inventors: Jorg Hohmann, Uhlandstrasse 6a, 59872 Meschede (DE); Frank Hohmann, Josef-Menke-Strasse, 59581 Warstein (DE)

( * ) Notice: Subject to any disclaimer, the term of this patent is extended or adjusted under 35 U.S.C. 154(b) by 0 days.

(21) Appl. No.: 11/574,700

(22) PCT Filed: Aug. 4, 2005

(86) PCT No.: PCT/EP2005/008455

§ 371 (c)(1),
(2), (4) Date: Mar. 5, 2007

(87) PCT Pub. No.: WO2006/027060

PCT Pub. Date: Mar. 16, 2006

(65) Prior Publication Data

US 2008/0034925 A1   Feb. 14, 2008

(30) Foreign Application Priority Data

Sep. 3, 2004   (DE) .................... 10 2004 043 145

(51) Int. Cl.
*B25B 29/02* (2006.01)
*B23P 19/06* (2006.01)
*F16J 10/02* (2006.01)
(52) U.S. Cl. .................... 81/57.38; 254/29 A
(58) Field of Classification Search ............ 81/57.38, 81/429; 254/29 A; 29/452
See application file for complete search history.

(56) References Cited

U.S. PATENT DOCUMENTS

| 3,115,332 | A | * | 12/1963 | Singleton et al. .......... 254/29 A |
| 3,128,990 | A | * | 4/1964 | Brooks et al. ............. 254/29 A |
| 3,837,694 | A |  | 9/1974 | Frisch et al. |
| 4,047,456 | A | * | 9/1977 | Scholz .................... 81/57.38 |
| 4,074,890 | A |  | 2/1978 | Boudet et al. |
| 4,815,344 | A | * | 3/1989 | Nemec et al. ............. 81/57.38 |
| 5,406,867 | A | * | 4/1995 | Junkers et al. ............ 81/57.38 |
| 2004/0165963 | A1 |  | 8/2004 | Bucknell |

FOREIGN PATENT DOCUMENTS

| CH | 552 448 | 6/1974 |
| DE | 30 47 674 | 7/1982 |
| DE | 43 41 707 | 6/1995 |
| EP | 0 200 459 | 11/1986 |

(Continued)

*Primary Examiner*—Hadi Shakeri
(74) *Attorney, Agent, or Firm*—Robert W. Becker; Robert Becker & Associates

(57) ABSTRACT

A hydraulic screw tensioning device includes a cylinder supported on a machine part that is to be clamped by a threaded bolt and nut. A first annular piston is guided in a sealed manner in a cylinder element, is disposed on the change sleeve, and is supported against an inclined surface of a monolithic collar of the change sleeve. At least one second annular piston is guided in a sealed manner in a cylinder element, is disposed on the change sleeve, and is supported against the first annular piston. Respective, facing inclined axial annular surfaces on the annular pistons and on the cylinder elements or annular shoulders thereof are inclined in the same direction and are pressure-remote. Annular surfaces on the second annular piston or pistons and on the annular shoulders of the cylinder elements extend perpendicular to the cylinder axis and are pressurized.

17 Claims, 2 Drawing Sheets

FOREIGN PATENT DOCUMENTS

| | | |
|---|---|---|
| EP | 200459 A2 * | 11/1986 |
| EP | 0 830 919 | 3/1998 |
| EP | 830919 A2 * | 3/1998 |
| GB | 177830 | 1/1970 |
| WO | WO 96/02363 | 2/1996 |

* cited by examiner

HYDRAULIC SCREW TIGHTENING OR TENSIONING DEVICE

This specification for the instant application should be granted the priority date of Sep. 3, 2004, the filing date of the corresponding German patent application 10 2004 043 146.9 as well as the priority date of Aug. 4, 2005, the filing date of the corresponding International patent application PCT/EP2005/008455.

BACKGROUND OF THE INVENTION

The present invention relates to a hydraulic screw tightening or tensioning device for tightening and loosening highly stressed screws or bolts.

Applicants' hydraulic threaded bolt tensioning devices known from DE 43 41 707 A1 and DE 196 38 901 A1 are comprised of a cylinder that is supported on a machine part that is to be clamped by a threaded bolt and a nut, at least one piston that is guided therein in a sealed manner, is periodically supplied with pressure, is supported on an extension of a change sleeve threaded onto a thread of the threaded bolt, and forms an annular chamber with the cylinder, and a pressure medium supply to the annular chamber.

The object of such screw tensioning devices is to apply a precisely prescribed tensioning force onto a screw in order to be able to tighten or loosen the nut that is threaded onto the screw. For this purpose, a change sleeve in the screw tensioning device is threaded onto the projecting thread above the nut, and thereafter the screw tensioning device is placed under hydraulic pressure. The result is that the screw is tensioned by extension. The forces thereby applied to the screw are extremely great, thus very greatly stressing the screw tensioning device and its components.

With these hydraulic screw tensioning devices: in particular the change sleeve is a highly stressed component that after a certain number of screw extensions, i.e. load changes, can fail in the region of the threaded end of the screw or bolt.

Since in such a case the entire system relaxes in an abrupt manner, the failed or broken-off part of the threaded sleeve, together with the piston and the cylinder, can be spun away with considerable energy, and significant damage to adjacent machine components can occur, and operators can be injured. To avoid this, a trapping or collection device for these parts of the screw tensioning device is provided in DE 43 41 707A1.

However, to avoid a failure of the change sleeve, and to prevent the load change that is absorbed by these parts from being exceeded up to a fatigue failure, the object of DE 196 38 901 A1 is to replace the parts that are endangered by fatigue failure before such fatigue failure can occur. For this purpose, provided on the hydraulic screw tensioning device is a load change counter that, by means of the periodic pressurization of the screw tensioning device, is advanced upon each actuation, whereby the counting of no-load or idle strokes is prevented in that the load change counter is advanced only above a prescribed pressure.

The known hydraulic screw tensioning devices have proven advantageous and can be designed to have single or multiple stages in order to apply the forces that are required for all current sizes of the threaded bolts in order to bring about a predetermined extension.

European patent application EP 0 200 459 A2 discloses a hydraulic screw tensioning device according to which a change sleeve that can be threaded onto the threaded bolt that is to be tensioned is provided with a collar having an inclined surface against which is supported an annular piston that is disposed on an annular change sleeve. The annular piston and an annular shoulder on a cylinder element interengage and are guided in a sealed manner against one another. The facing, pressurized surfaces of the annular piston and of the cylinder element are respectively angled off in the same direction, so that due to the pressurization, a very high, expanding bending moment acts upon these annular surfaces, whereby this bending moment can be counteracted only by an appropriately large dimensioning of the elements in order to prevent wear of the seals and on the surfaces that glide on one another. Since such hydraulic screw tensioning devices are often used on threaded bolts that are disposed close together, any enlargement of the dimensions in a radial direction is a drawback.

It is an object of the present invention to embody the components that are endangered by fatigue failure such that they can be subjected to a high number of load changes before fatigue failure can occur, in other words, that these highly stressed individual components can be used for a longer period of time before they have to be replaced. Furthermore, a screw tensioning device that is compact not only in diameter but also in length is to be made available, whereby the wear and tear of the piston and cylinder surfaces that slide against one another, as well as of the respective seals, is as low as possible.

SUMMARY OF THE INVENTION

Proceeding from this object, with a hydraulic screw tensioning device for tightening and loosening highly stressed screws or bolts, and having a cylinder supported on a machine part that is to be clamped by a threaded bolt and a nut, and having a change sleeve that can be threaded onto a threaded end of the threaded bolt, proposed is at least one first annular piston that is guided in a sealed manner in a cylinder element and is disposed on the change sleeve, the piston being supported against an inclined surface of a collar that is monolithic with the change sleeve, wherein the inclined surface merges into the outer surface of the change sleeve via a rounded-off groove, and further proposed is at least one second annular piston that is guided in a sealed manner in a cylinder element and is disposed on the change sleeve and supported against the first annular piston whereby the pressure-remote facing axial annular surfaces of the further annular piston or pistons and of the annular shoulders of the cylinder elements are inclined in the same direction, while the pressurized annular surfaces of the further annular piston or pistons and of the annular shoulders of the cylinder elements extend perpendicular to the axis of the cylinder.

The particularly highly stressed change sleeve has no shoulders, threads or the like on its outer surface that can cause tearing effects, but rather has a smooth, cylindrical configuration and is provided only with a collar of greater diameter, the inclined surfaces of which serve to increase the moment of resistance of the collar to bending, since the entire piston force acts upon this collar. Due to the transition of the inclined surfaces into the change sleeve via a groove that is rounded off with a large radius, no tearing effects can occur at this location. The only region of the change sleeve that is endangered by tearing effects is in the region of the threaded end, where a reduction of the tearing effects is achieved by a rounding-off of the thread base and the transitions, and possibly also by rolling compaction of the thread base. The change sleeve is thus a simple cylindrical component onto which the first annular piston and possibly further annular pistons are merely disposed.

If at least two annular pistons are disposed on the change sleeve and are supported against one another, the maximum stroke of the first annular piston that is supported on the collar of the change sleeve can be greater than the maximum stroke of the further annular piston or pistons that are supported on this annular piston and are disposed on the change sleeve.

As a result, when the maximum stroke occurs, only the piston force of the first annular piston, and not the sum of the piston forces, acts upon the end of the screw tensioning device.

The maximum stroke of the first annular piston can be determined by the maximum displacement of the change sleeve that is limited by an abutment, while the maximum stroke of each further annular piston is determined by the axial spacing between the pressure-remote, facing axial annular surfaces of the further annular piston or pistons and the annular shoulders of the cylinder elements.

By means of a cap threaded onto the cylinder element for the first annular piston, and a cup spring means disposed therein, the maximum displacement of the change sleeve can be determined that corresponds to the difference between the height of the compressed cup springs and the spacing of the underside of the cap from the collar of the change sleeve.

The cylinder of the screw tensioning device is preferably comprised of threaded-together cylinder elements that are each provided with an inwardly projecting, annular shoulder that is monolithic with the respective cylinder element and cooperates with a respective annular piston, whereby respectively at least one of the axial annular surfaces of the annular pistons and/or of the annular shoulders are inclined in order to increase the moment of resistance to bending.

In this way, as many cylinder elements and annular pistons as desired can be disposed in series in order to be able to apply a required tensioning force at a prescribed maximum pressure of the pressure generator. In this way, not only the overall height of the screw tensioning device, but also its diameter, changes, so that it can also be used for tensioning screws that are disposed close to one another, and it is possible to place such screw tensioning devices on all of the screws of a machine part that is to be tensioned and to simultaneously actuate the devices in order to prevent a distortion of the component during tensioning of the screws.

The annular pistons that are disposed on the change sleeve can preferably be supported against one another by means of cylindrical extensions that surround the change sleeve and are monolithically produced therewith.

A cylindrical extension that is monolithically produced with the first annular piston preferably surrounds the collar on the change sleeve, whereby the angle of the inclined surface of the collar on the change sleeve, and the corresponding inclined axial annular surface of the first annular piston that rests there against, the radius of its effective piston surface, and the thickness of the cylindrical extension that surrounds the collar on the change sleeve, are coordinated with one another in such a way that the radial forces that result due to the wedge effect of the inclined surfaces from the axial forces of the annular piston or the further annular pistons, and that act on the first annular piston, are essentially absorbed without expansion.

A stroke control indication means for the change sleeve can be achieved if a cylindrical extension of the change sleeve, about which the cup spring means extends, is guided through a bore in the cap, and is provided with an indicator.

To achieve a rapid threading of the change sleeve onto the threaded end of the screw that is to be tensioned, a hexagonal recess or the like can be disposed in the end of the cylindrical extension for the positive application of a turning tool for the change sleeve.

Furthermore, the change sleeve can be provided with an axial through bore through which can be introduced a measuring rod or pin for measuring the screw projection and/or the screw extension.

After successful extension of the screw via the screw tensioning device, a nut that is threaded between the machine part and the change sleeve can be tightened from the outside with little force until it rests against the machine part. This can be effected either in that a sleeve, which is provided with a hexagonal recess and is placed over the nut, is rotated from the outside by a gear that engages in the cylinder through an opening, or in that a rotation of the nut is effected through an opening in the cylinder via a pin. The rotating along of the nut is preferably effected from the outside by means of a gear mechanism that is comprised of a plurality of gears, engages in a toothing on the rotary sleeve, and the gear of which that for the rotating along of the nut is driven from the outside rotates in the same direction as the rotary sleeve, resulting in an evident correspondence between the rotary drive and the rotation of the rotary sleeve.

The rotary sleeve, which is disposed in the region of the cylinder that is supported on the machine part and that positively extends about the nut that is to be tightened, can preferably be axially displaceable against spring force, so that when the screw tensioning device is placed on, and there is no correspondence between the wrench surfaces of the rotary sleeve and the nut, the nut can spring away upwardly without damaging the nut.

With the screw connections that are to be tensioned, in part shims are used, and also nuts having different heights are used. In order to be able to compensate for this, exchangeable spacers having different heights can be disposed at the base of the cylinder that is supported on the machine part.

An easy handling of the inventive screw tensioning device is provided by a ring that extends about the cylinder element of the first annular piston or about the cap is provided with a foldable handle, and is axially secured by a snap ring that engages in a groove in the cylinder element or of the cap.

BRIEF DESCRIPTION OF THE DRAWINGS

The invention will be explained in detail subsequently with the aid of an embodiment that is illustrated in the drawings, in which.

DESCRIPTION OF SPECIFIC EMODIMENTS

Figure 1:
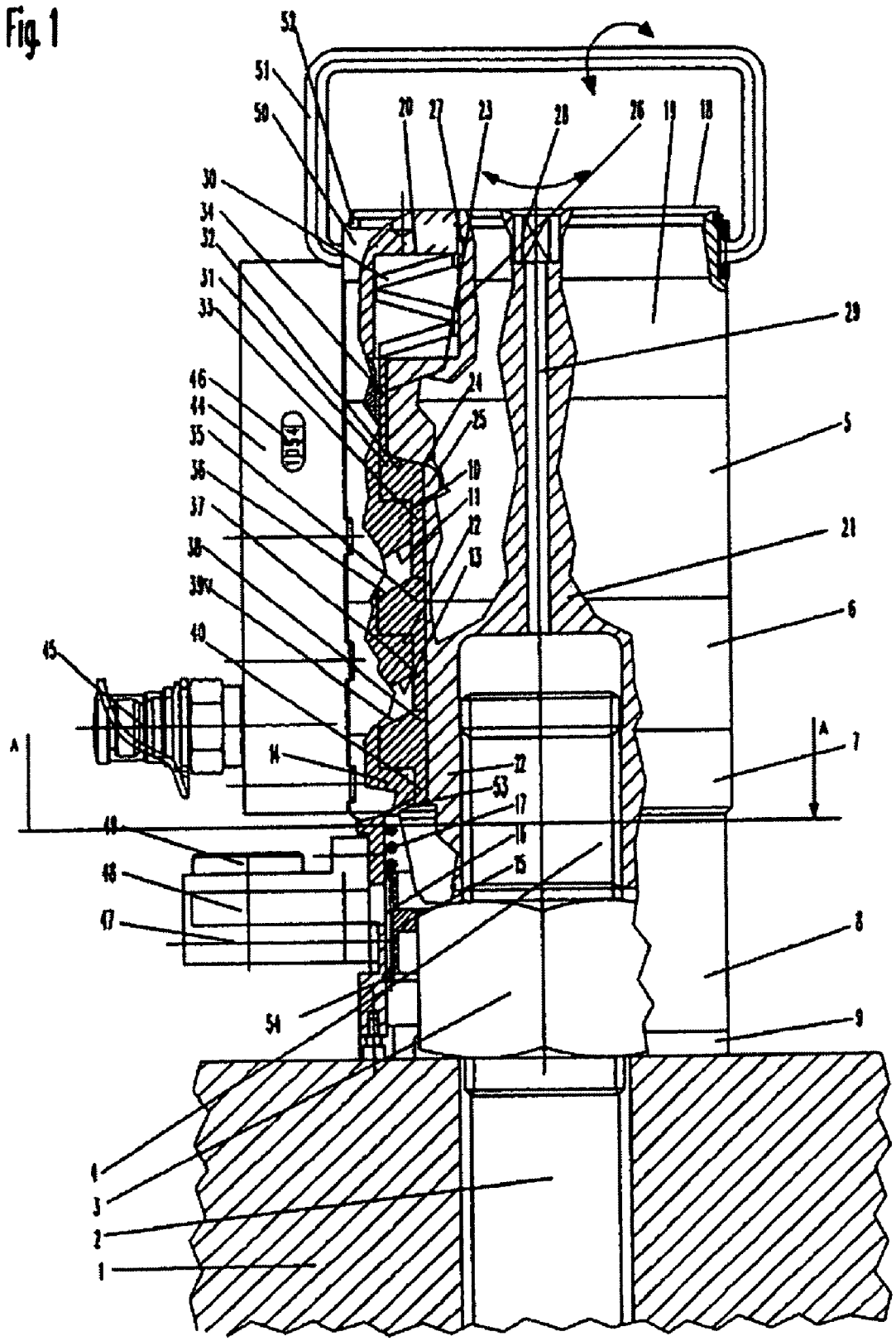
FIG. 1 shows a schematic longitudinal cross-sectional view through an inventive screw tensioning device.
Figure 2:
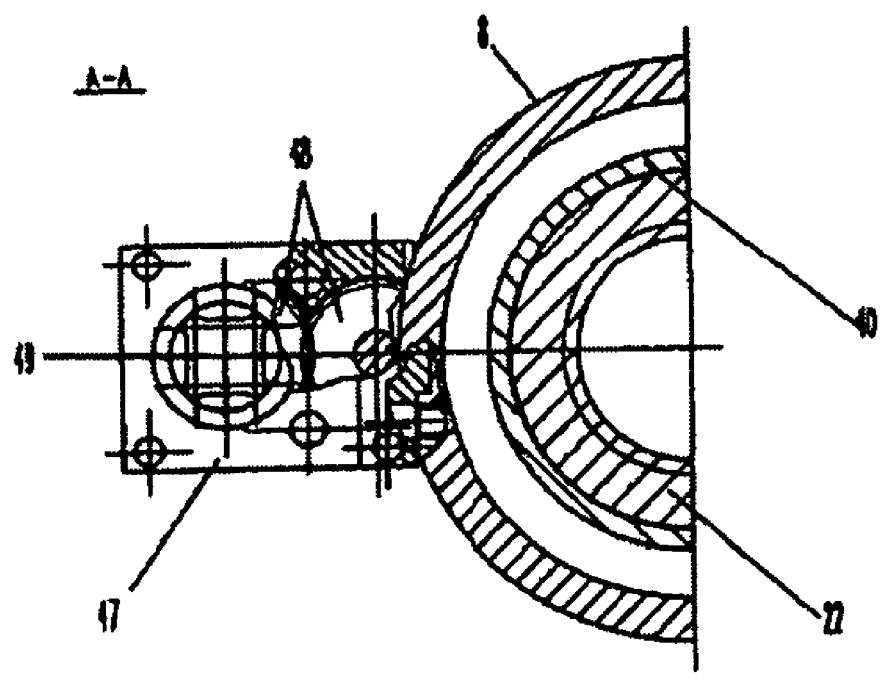
FIG. 2 is a cross-sectional view taken along the line II-II in FIG. 1.

A machine part 1, which can, for example, be a flange of a machine housing, is to be tensioned or tightened by means of a threaded bolt 2 and a nut 3 that is threaded thereon. In order to be able to apply a precisely controllable pre-tensioning upon the threaded bolt 2, and in order to be able to keep twisting or torsion moments away from the threaded bolt 2, which represent an additional stressing of the threaded bolt 2, the nut 3 is initially only manually threaded upon the threaded bolt 2 until it rests against the machine part 1. The length of the threaded bolt 2 is measured such that a free threaded end 4 projects beyond the nut 3.

The screw tensioning device is comprised of a cylinder composed of cylinder elements 5, 6, 7, whereby the cylinder element 7 is extended by a portion 8 that is supported on the machine part 1.

To adapt to different nut heights, and possibly to shims placed between the machine part 1 and the nut 3, a spacer 9 is threaded onto the portion 8. This spacer 9 can be exchanged with other spacers having different heights.

The cylinder elements 5, 6, 7 are screwed together, and are provided with annular shoulders 10, 12 and 14 having seals, whereby at least one axial annular surface 11, 13, 53 of the shoulders is inclined in order to increase the bending moment of resistance of the annular shoulders 10, 12, 14 and hence to prevent the deformation thereof, which increases wear.

Disposed in the portion 8 that is supported on the machine part 1 is a rotary sleeve 15 that is provided with a hexagonal recess that positively engages the nut 3. The outer surface of the rotary sleeve 15 is provided with a toothing 16. The rotary sleeve 15 is prevented from falling out of the portion 8 by means of a snap ring 54.

To prevent damage to the nut 3 when the screw tensioning device is placed upon the machine part 1 and when the hexagonal recess of the rotary sleeve 15 is rotated relative to the nut 3, the rotary sleeve 15 is axially displaceable against the force of a compression spring 17.

A cylindrical portion 19 of a cap or top 18 is threaded onto the end of the cylinder element 5; the cap has a rigid underside 20.

Disposed in the cylinder formed of the cylinder elements 5, 6, 7 is a change sleeve 21, the threaded portion 22 of which can be threaded onto the threaded end 4 of the threaded bolt 2. Disposed at the end of the change sleeve 21 opposite the threaded portion 22 is a collar 23 having an inclined surface 24 that merges into the cylindrical portion of the change sleeve 21 via a groove or channel 25 that is rounded off with a large radius.

A cylindrical extension 26 having a smaller diameter extends from the collar 23 through a bore in the underside 20 of the cap 18. Disposed in this cylindrical extension 26 is an annular groove 27 that can be colored and that represents a stroke control indicator for the change sleeve 21. When this annular groove 27 protrudes from the underside 20 of the cap 18, the maximum displacement of the change sleeve 21 has been achieved.

Disposed centrally in the cylindrical extension 26 is a hexagonal means 28 or the like for the positive engagement of a turning tool for example a battery-powered wrench, in order to be able to rapidly thread the change sleeve 21 onto the threaded end 4 of the threaded boat 2. A through bore 29 furthermore extends from the end of the cylindrical extension 26 to the threaded portion 22 of the change sleeve 21. A measuring rod can be introduced into this through bore 29 in order to measure the amount by which the threaded end 4 of the threaded bolt 2 extends beyond and also to be able to measure the extension of the threaded bolt 2 during tensioning by means of the screw tensioning device.

Disposed between the collar 23 and the underside 20 of the cap 18 is a cup spring means 30 that serves as a return spring for the change sleeve 21 and the annular pistons 31, 35, 38. This cup spring means 30 is characterized by high return forces but small installation dimensions.

The maximum displacement of the change sleeve 21 thus results from the difference between the spacing of the collar 23 from the underside 20 of the cap 18, and the height of the cup spring means 30.

Inserted onto the cylindrical portion of the change sleeve 21 is a first annular piston 31, the inclined surface 32 of which rests against the inclined surface 24 of the collar 23. The first annular piston 31 has a cylindrical extension 33, which extends about the cylindrical portion of the change sleeve 21, as well as a cylindrical extension 34 that extends about the collar 23. A second annular piston 35 is supported against the cylindrical extension 33 of the first annular piston 31; the second annular piston is also provided with a cylindrical extension 37. The second annular piston 35 has an inclined surface 36, thereby increasing the moment of resistance to bending of the annular piston 35. A third annular piston 38 is supported against the cylindrical extension 37 of the second annular piston 35; the third annular piston is also provided with an inclined surface 39, which increases the moment of resistance to bending, and also has a cylindrical extension 40. All of the annular pistons 31, 35, 38 are sealed relative to the cylinder elements 5, 6, 7 by means of sealing elements, which are not illustrated in detail.

The maximum stroke of the annular pistons 35 and 38 is limited by the abutment of the inclined surface 36 against the inclined surface 11, and the inclined surface 39 against the inclined surface 13, while the maximum stroke of the annular piston 31, and hence the maximum displacement of the change sleeve 21, as previously mentioned, is determined by the difference between the spacing of the underside 20 of the cap 18 from the collar 23 and the height of the cup spring means 30. When these maximum strokes have been covered, only the piston force of the piston 31 acts upon the underside 20 of the cap 18, since the piston force of the annular pistons 35 38 is absorbed by the annular shoulders 10, 12 on the annular elements 5, 6.

A pressure medium distributor 44 having a connection fitting 45 for a hydraulic line is sealingly threaded on the cylinder elements 5, 6, 7. Pressure medium from this pressure medium distributor 44 is supplied to the cylinder chambers between the annular shoulders 10, 12, 14 and the annular pistons 31, 35, 38.

Disposed on the pressure medium distributor 44 is a load cycle counter 46 that counts the load strokes that act upon the change sleeve 21, avoiding counting of no-load or idle strokes, thus providing an indication for the replacement of the change sleeve 21 before fatigue failure occurs.

The rotation of the rotary sleeve 47 is effected by a gear mechanism 47 in which is disposed at least one pair of gears 48 and which meshes with the toothing 16 on the rotary sleeve 15. If the first gear in the gear mechanism 47 is rotated by means of a turning device inserted into a square recess 49, the rotary sleeve 15 rotates in the same direction, so that an evident correspondence is achieved between the rotation of the square recess 49 and the nut 3.

A straightforward manipulation of the screw tensioning device is provided by a folding handle 51 secured to a ring 50. This ring 50 extends about the cylindrical portion 19 of the cap 18, and is axially secured by means of a snap ring 52. As a result, the folding handle 51 is rotatable in all directions about the axis of the screw tensioning device.

The specification incorporates by reference the disclosure of German priority document 10 2004 043 145.0 filed Sep. 3, 2004 and PCT/EP2005/008455 filed Aug. 4, 2005.

The present invention is, of course, in no way restricted to the specific disclosure of the specification and drawings, but also encompasses any modifications within the scope of the appended claims.

The invention claimed is:

1. A hydraulic screw tensioning device for tightening and loosening highly stressed screws or bolts, comprising:
    a cylinder (5-7) adapted to be supported on a machine part (1) that is adapted to be clamped by a threaded bolt (2) and a nut (3), said nut (3) being threaded onto a threaded end (4) of said threaded bolt (2);
    a change sleeve (21) having a threaded proximate portion (22), wherein said threaded proximate portion is adapted to be also threaded onto the threaded end (4) of said threaded bolt (2), extending through the nut (3);

a first annular piston (31) guided in a sealed manner in an element of said cylinder (5-7), wherein said first annular piston (31) is fitted onto said change sleeve (21) by a push fit;

an annular surface on said first annular piston (31), wherein said annular surface extends perpendicular to an axis of said cylinder (5-7) and is adapted to be pressurized;

a collar (23) that is monolithic with said change sleeve (21) at its distal end, opposite to and remote from the threaded portion (22), wherein an inclined surface (32), axially remote from said perpendicular surface of said first annular piston (31), is supported on an inclined surface (24) of said collar (23), and wherein said inclined surface (24) merges into an outer surface of said change sleeve (21) via a rounded-off groove (25);

at least one second annular piston (35) guided in a sealed manner in an element of said cylinder (5-7), wherein said at least one second annular piston (35) is fitted onto said change sleeve (21) and is supported against said first annular piston (31) by a push fit;

respective, facing inclined axial annular surfaces (36, 39; 11, 13) on said at least one second annular piston (35, 38) and on said element of said cylinder (5-7) or on annular shoulders (10, 12) of said cylinder (5-8), wherein said axial annular surfaces are inclined in the same direction and are located on a pressure-remote side of said at least one second annular piston facing away from pressure, said facing inclined axial annular surfaces defining a limit for a maximum stroke of said at least one second annular piston; and respective, facing annular surfaces on said at least one second annular piston (35, 38) and on said annular shoulders (10, 12) of said cylinder (5-7), axially remote from said facing inclined axial annular surfaces (36, 39; 11, 13), wherein said annular surfaces extend perpendicular to an axis of said cylinder (5-7) and are adapted to be pressurized.

2. A screw tensioning device according to claim 1, wherein at least two annular pistons (31, 35) are disposed on said change sleeve (21) and are supported against one another, wherein a maximum stroke of said first annular piston (31), which is supported on said collar (23) of said change sleeve (21), is greater than a maximum stroke of said at least one second annular piston (35), which is supported against said first annular piston (31) and is disposed on said change sleeve (21).

3. A screw tensioning device according to claim 2, wherein said maximum stroke of said first annular piston (31) is determined by a maximum displacement of said change sleeve (21), which is delimited by an abutment (20), and wherein the maximum stroke of each at least one second annular piston (35, 38) is determined by an axial spacing between said pressure-remote, facing axial annular surfaces (36, 39; 11, 13) of said at least one second annular piston (35, 38) and said annular shoulders (10, 12) of said elements of said cylinder (5-7).

4. A screw tensioning device according to claim 2, wherein said maximum displacement of said change sleeve (21) is determined by a cap (18), which is adapted to be threaded onto said element of said cylinder (5-7) for said first annular piston (31), and by a cup spring means (30) disposed in said cap (18).

5. A screw tensioning device according to claim 2, wherein a pressure medium distributor (44) is threaded in a sealed manner on elements of said cylinder (5-7), wherein said pressure medium distributor (44) is provided with a connection fitting (45) for a pressure medium hose, and wherein pressure medium is adapted to be supplied via said pressure medium distributor (44) to each annular cylinder chamber formed between one of said annular pistons (31, 35, 38) and one of said annular shoulders (10, 12, 14).

6. A screw tensioning device according to claim 5, wherein a load cycle counter (46) is integrated into said pressure medium distributor (44).

7. A screw tensioning device according to claim 1, wherein said cylinder (5-7) is composed of threaded-together cylinder elements (5, 6, 7) that are each provided with an inwardly extending annular shoulder (10, 12, 14) that is monolithic with the respective cylinder element (5, 6, 7) and cooperates with a respective one of said annular pistons (31, 35, 36), and wherein respectively at least one of said axial annular surfaces (36, 39; 11, 13) of said at least one second annular piston (35, 38) and/or of said annular shoulders (10, 12) is angled off to increase a moment of resistance to bending.

8. A screw tensioning device according to claim 1, wherein said annular pistons (31, 35, 38) are supported against one another by means of cylindrical extensions (33, 37) that are monolithic therewith and that surround said change sleeve (21).

9. A screw tensioning device according to claim 8, wherein a cylindrical extension (26) of said change sleeve (21), about which extends a cup spring means (30), is guided through a bore in a cap (18) that is adapted to be threaded onto said cylinder element for said first annular piston (31), and wherein said cylindrical extension (26) is provided with a stroke control indication means (27).

10. A screw tensioning device according to claim 9, wherein engagement means (28) are disposed in an end of said cylindrical extension (26) for positive application of a turning tool for said change sleeve (21).

11. A screw tensioning device according to claim 9, wherein said change sleeve (21) is provided with an axial through bore (29) for introduction of a measuring pin for measuring a screw projection and/or a screw extension.

12. A screw tensioning device according to claim 1, wherein a cylindrical extension (34), which is monolithic with said first annular piston (31), surrounds said collar (23) of said change sleeve (21).

13. A screw tensioning device according to claim 12, wherein an angle of an inclined surface (24) of said collar (23) of said change sleeve (21), a corresponding inclined axial annular surface (32) of said first annular piston (31) that rests against said inclined surface (24) of said collar (23), a radius of an effective piston surface of said first annular piston (31), and a thickness of said cylindrical extension (34) that surrounds said collar (23) of said change sleeve (21), are coordinated with one another such that radial forces that result in said first annular piston (31) due to the wedge effect of said inclined surfaces (24, 32) from axial forces of said at least one second annular piston (35, 38) acting upon said first annular piston (31), are absorbed essentially without expansion.

14. A screw tensioning device according to claim 1, wherein a rotary sleeve (15) is disposed in the region (8) of an element of said cylinder (5-7) that is supported on said machine part (1), and wherein said rotary sleeve (15) is adapted to positively surround said nut (3) and is axially displaceable against spring force (17).

15. A screw tensioning device according to claim 14, wherein a gear mechanism (47) composed of a plurality of gears (48) is disposed on said cylinder element in the vicinity of said rotary sleeve (15), wherein said gear mechanism (47) is adapted to engage in toothing (16) provided on said rotary sleeve (15), and wherein one of said gears (48) of said gear mechanism (47) that is adapted to drive said nut (3) along from the outside is adapted to rotate in the same direction as said rotary sleeve (15).

16. A screw tensioning device according to claim 1, wherein exchangeable spacers (9) having different heights are adapted to be disposed at the base of an element of said cylinder (5-7) that is supported on said machine part (1).

17. A screw tensioning device according to claim 1, wherein a ring (50) having a folding handle (51) surrounds said cylinder element of said first annular piston (31) for a cap (18) that is adapted to be threaded onto said cylinder element, and wherein a snap ring (52) is provided for axially securing said ring (50).

* * * * *